(12) United States Patent
Lorenz (10) Patent No.: US 10,899,431 B2
(45) Date of Patent: Jan. 26, 2021

(54) SYSTEM FOR DRIVING AND GUIDING OF A MULTIFUNCTIONAL TRAILING EDGE CONTROL SURFACE ON AN AIRCRAFT

(71) Applicant: Airbus Operations GmbH, Hamburg (DE)

(72) Inventor: Florian Lorenz, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 18 days.

(21) Appl. No.: 16/356,059

(22) Filed: Mar. 18, 2019

(65) Prior Publication Data
US 2019/0210711 A1    Jul. 11, 2019

Related U.S. Application Data

(63) Continuation of application No. PCT/EP2017/073493, filed on Sep. 18, 2017.

(30) Foreign Application Priority Data

Sep. 30, 2016    (EP) ..................... 16191866

(51) Int. Cl.
*B64C 9/00*    (2006.01)
*B64C 9/18*    (2006.01)
(Continued)

(52) U.S. Cl.
CPC .................. *B64C 9/18* (2013.01); *B64C 9/00* (2013.01); *B64C 9/08* (2013.01); *B64C 9/16* (2013.01); *B64C 13/00* (2013.01); *B64C 13/40* (2013.01)

(58) Field of Classification Search
CPC .... B64C 9/18; B64C 9/08; B64C 9/16; B64C 13/40
See application file for complete search history.

(56) References Cited

U.S. PATENT DOCUMENTS 8,511,608 B1    8/2013 Good et al.
2009/0134281 A1*    5/2009 Engelbrecht .............. B64C 9/16
                                                                244/215

FOREIGN PATENT DOCUMENTS

DE    4107556 C1    5/1992
WO    20090019011 A2    2/2009
WO    2012045796 A1    4/2012

OTHER PUBLICATIONS

International Searching Authority, International Search Report for International Patent Application No. PCT/EP2017/073493, dated Nov. 28, 2017.

(Continued)

*Primary Examiner* — Richard R. Green
*Assistant Examiner* — Steven J Shur
(74) *Attorney, Agent, or Firm* — Nixon & Vanderhye P.C.

(57) ABSTRACT

A system for driving and guiding a trailing edge control surface on a trailing edge region of an aircraft wing comprises a first guide device coupled with the control surface to guide the control surface along a predetermined trajectory relative to the trailing edge region between a retracted position and an extended position, a first drive device couplable with the wing and the control surface to move the control surface along the trajectory, and a second drive device coupled with the control surface and couplable with one of the wing and the first guide device to influence the incidence angle of the control surface, wherein the first drive device and the second drive device are separate from each other and are operable independently, such that the incidence angle of the control surface is influencable at least in the retracted position of the control surface.

13 Claims, 5 Drawing Sheets

(51) Int. Cl.
*B64C 9/16* (2006.01)
*B64C 9/08* (2006.01)
*B64C 13/00* (2006.01)
*B64C 13/40* (2006.01)

(56) References Cited

OTHER PUBLICATIONS

European Searching Authority, European Search Report for European Patent Application No. EP3301018, completed Apr. 19, 2017.

* cited by examiner

SYSTEM FOR DRIVING AND GUIDING OF A MULTIFUNCTIONAL TRAILING EDGE CONTROL SURFACE ON AN AIRCRAFT

CROSS-REFERENCE TO PRIORITY APPLICATIONS

This application is a continuation of international patent application number PCT/EP2017/073493, having an international filing date of Sep. 18, 2017, which claims priority to European patent application number EP 3301018A1, having a filing date of Sep. 30, 2016. The content of the referenced applications is incorporated by reference herein.

TECHNICAL FIELD

Embodiments of the subject matter described herein relate generally to a system for driving and guiding of a trailing edge control surface arranged on a trailing edge region of a wing of an aircraft, a use of a trailing edge control surface, and an aircraft having a wing comprising a system for driving and guiding of a trailing edge control surface arranged on a trailing edge region of the wing.

BACKGROUND

Wings of civil aircraft are often equipped with a plurality of different control surfaces, which are movably supported on the wing. During flight, the control surfaces are exposed to an airflow and, depending on their orientation to the wing and thus to the airflow surrounding the wing, produce a force with a certain magnitude and direction. Hence, through moving the control surfaces the attitude of the aircraft is controlled.

The control surfaces are tailored and dimensioned to meet their respective tasks. It is common that all control surfaces serve for a distinct function and are placed and designed corresponding thereto. For example, ailerons influence the rolling motion of the aircraft and are preferably placed in outboard regions of the wing to make use of a large lever arm to the longitudinal axis of the aircraft. They belong to the so-called primary flight control system and are usually capable to be moved rather quickly.

Other control surfaces serve for increasing the surface area and camber of the wing in order to increase the lift coefficient and thereby to enable a reduction of required flow velocities particularly for facilitating take-off and landing. These "high-lift" surfaces are often arranged on further inboard regions and central regions of the wing. They belong to the so-called "secondary flight control system" and commonly do not require great velocities for their activation or deactivation. High-lift surfaces may exemplarily be realized in the form of leading edge slats and/or trailing-edge flaps, which may be moved between a retracted position, in which they constitute a part of a clean wing, and an extended position, in which they may provide an enlarged surface area as well as a gap to a main wing structure.

Different support and guiding devices are known for moving the trailing edge flap between the retracted and extended positions. For example, it is known to use a track comprising a rail and a carriage movably supported on the rail as well as a rear link, wherein the combination of the spatial shape of the rail and the measures and orientation of the rear link defines the trajectory of the flap. Further, so-called dropped hinge mechanisms are known, which lead to a partly circular motion around a hinge axis. The orientation and position of the flap as well as connecting links to the flap define the trajectory of the flap.

As an example, patent document WO 2012 045 796 A1 shows a high-lift system for a wing of an aircraft, comprising movably held high-lift flaps, at least one drive unit, at least one transmission shaft connected to the drive unit, and several actuator devices, distributed on the transmission shaft and connected to the high-lift flaps, for moving the high-lift flaps.

BRIEF SUMMARY

Particularly the arrangement of high-lift flaps and ailerons at the trailing edge of a wing need to be balanced under consideration of their specific demands, their functions and the available installation space on the trailing edge. Hence it is an object of the disclosure to provide a flight control system or a wing having such a control system, with which the functionality and efficiency of high-lift flaps and/or ailerons may be improved, without requiring an enlargement of their respective installation spaces and without requiring heavy modifications to the wing itself.

This object is met by the system for driving and guiding of a trailing edge control surface arranged on a trailing edge region of a wing of an aircraft having the features of independent claim 1. Advantageous embodiments and further improvements may be gathered from the sub-claims and the following description.

It is proposed a system for driving and guiding of a trailing edge control surface arranged on a trailing edge region of a wing of an aircraft. The system comprises a first guide device attachable to the wing and coupled with the control surface for guiding the control surface along a predetermined trajectory relative to the trailing edge region of the wing between a retracted position and at least one extended position. The system further comprises a first drive device couplable with the wing and the control surface for moving the control surface along the trajectory. A second drive device is coupled with the control surface and couplable with one of the wing and the first guide device for additionally influencing the incidence angle of the control surface. The first drive device and the second drive device are separate from each other and are operable independently, such that the incidence angle of the control surface is influencable at least in the retracted position of the control surface.

Resultantly, the system according to the disclosure provides a multi-functional control surface for the integration to a trailing edge region of a wing. It is an aim of the system to provide a control surface that is not only extendable relative to the wing but that is also movable for influencing its incidence, i.e. its angle of incidence. This means, that the trailing edge control surface mentioned above selectively serves as a common high lift flap and/or as an aileron.

Hence, the installation space available at the trailing edge of the wing is used more efficiently and the flight performance of the aircraft may even be improved. While the high lift function is at least maintained, the available surface area for a roll control of the aircraft is increased.

The basic concept of the system according to the disclosure is explained in the following.

First of all, the trailing edge control surface is preferably realized as a flap having a construction comparable to common trailing edge flaps of a high-lift system. It may preferably be designed to create a part of the wing contour in the retracted position. Mechanical joints for coupling the trailing edge control surface with the first guide device, the first drive device and the second drive device need to be chosen depending on the detailed design of particularly the first guide device.

The trailing edge flap is extendable and retractable, wherein a retracted position leads to a clean wing and is primarily used for cruise flight. Extended positions are used for high lift.

The trailing edge control surface may exemplarily comprise a plurality of stiffening elements in form of ribs and/or spars. A skin may be attached to the ribs and defines the outer surface of the trailing edge control surface being exposed to an airflow. An interior side of the skin may be equipped with a plurality of stringers. The ribs may exemplarily comprise connecting means for coupling the control surface with the first guide device, the first drive device and the second drive device. However, if another design of the trailing edge control surface is desired, connecting means may be chosen appropriately. In particular, the above mentioned construction principle is particularly suitable for metallic constructions. The use of fiber reinforced composite materials may be subject to a different construction principle.

The trajectory of the trailing edge control surface depends on the design of the aircraft, desired high-lift characteristics, the detail design of the trailing edge flap and other parameters. The trajectory should therefore not be limited to a certain shape.

A suitable trajectory may include a combination of both a translational as well as a rotational motion path. The rotational motion path may superpose the translational motion path. As an alternative, both motion paths may be arranged substantially separate, i.e. one behind the other. For increasing the surface area of the wing it is required that the trailing edge control surface is at least partially moved in a chordwise direction relative to the wing chord. By moving the trailing edge control surface in such a direction, the distance between the leading edge of a wing main structure and the trailing edge of the trailing edge control surface is increased. By additionally providing a rotational motion path, the camber of the wing including the trailing edge control surface is increased, which positively influences the lift coefficient.

Preferably, the trajectory is dimensioned such that in an extended position of the trailing edge control surface, a gap between the wing main structure or a spoiler, a flap or another secondary structure panel fixed to the wing main structure and the leading edge of the trailing edge control surface is created.

The first guide device is exclusively provided for moving the trailing edge control surface along such a trajectory. Different designs of the first guide means are presented further below with reference to different embodiments.

The first drive device, which is couplable with the wing and coupled with the control surface, moves the trailing edge control surface along this trajectory, guided by the first guide device. It is not necessary to connect the first drive device to the trailing edge control surface directly, as long as a force induced by the first drive device reaches the control surface for its motion. As explained further above it is not required to have a quickly moving trailing edge flap, such that the first drive device does not necessarily have to provide high motion speeds. Consequently, a spindle drive may constitute an efficient drive device, which is capable to provide large moving and holding forces. However, other drive devices are not ruled out.

The first drive device may be an integrated part of the first guide device. This may be accomplished by e.g. by letting an actuator or another active component of the first drive device act as a lever or a link having a variable length in a multi-link chain. Still further, the first drive device may simply be arranged between a structural part of the wing main structure and a component of the first guide device, such that by extending or retracting an active component of the first drive device, the respective component of the first guide device is moved relative to the main structure of the wing. Still further, the first drive device may be arranged between a structural part of the wing and a joint of the trailing edge control surface, such that the control surface is directly driven by the first drive device and is guided by the first guide device.

The second drive device, which is intended to substantially exclusively influence the incidence of the trailing edge control surface, may be arranged between a joint of the trailing edge control surface and a component of the first guide device. As an alternative, the second drive device may be integrated into the first guide device and act on a component that is connected to the control surface in order to influence its angle of incidence. Coupling the second drive device with a component of the first guide device leads to maintaining a desired angular position of the trailing edge control surface and the first guide device independent from the actual position of the first drive device. Hence, the incidence of the trailing edge control surface is influencable in each state of the trailing edge control surface.

As stated in the background section above, it may be desired that ailerons are capable of being moved more quickly in comparison to high-lift surfaces. Hence, the second drive device may include an actuator, that is equal to or comparable with an actuator that commonly drives an aileron. For example, it may be realized as a fluid actuator, such as a hydraulics actuator. If a complete trailing edge flap is used for achieving an aileron functionality as explained above it has to be kept in mind that the required deviation angle for the intended aileron functionality is less compared to common ailerons, since the control surfaces has a drastically increased area. In general, a higher actuation speed compared to high lift devices may be necessary, but the degree of difference in actuation speeds may be less than in common systems.

Furthermore, regarding the high lift function, surfaces on both wings are driven basically equally, i.e. the extended positions on both the right and the left hand flap are the same. However, the second drive device moves the control surfaces differentially for reaching the aileron functionality.

Both the first drive device and the second drive device are separate from each other, such that the operation of one of the drive devices does not affect the operation of the other one of the drive devices. Also, both drive devices are operable independently from each other, such that incidence and high-lift state are adjustable independently.

In a preferred embodiment, the first drive device comprises a first actuator and the second drive device comprises a second actuator, wherein the type of functional principle of the first actuator and the second actuator differ. As explained above, both actuators in both drive devices are intended to provide different tasks. While the first actuator is intended for acting on the control surface to change the high-lift state of the aircraft for a certain period of time, the second actuator is intended to continuously and quickly react on temporary control commands. Hence, the functional principles of both actuators differ in order to reflect these different requirements.

To further reflect these different requirements, the first actuator and the second actuator comprise different mechanical time constants. For example, in case the first drive device includes an electrically driven spindle drive, the mechanical time constant may depend on the characteristics of the electric motor driving the spindle. Further, if the first drive device is driven by a hydraulic motor, the mechanical time constant depends on further characteristics, such as hydraulic pressure, the type of construction and dimensioning of the motor. In case the second actuator includes a hydraulics cylinder, the mechanical time constant depends on the size of the piston, the cylinder volume and other parameters. With hydraulic components the properties of the hydraulic fluid are dimensioning as well.

In a further preferred embodiment, the first actuator of the first drive device is self-locking. Thus, after moving the trailing edge control surface by means of the first drive device, the first actuator may be stopped and, due to its self-locking design, holds its momentary position. For example, in case the first actuator is a spindle drive, the thread of the spindle and a nut being moved on the spindle are designed so as to prevent a rotation of the spindle when a load acts on the nut.

In an exemplary embodiment, the first guide device comprises a rail on a track beam, a carriage movably engaging the rail and a rear link swivably mounted on the track beam. The control surface is coupled with the carriage and the rear link. The second actuator is integrated into the rear link. The first guide device constitutes a flap track mechanics with the rail on the track beam and the rear link together defining the trajectory of the control surface. The rail provides a path along which the carriage can move. Preferably, the rail comprises a bearing surface and an undercut, wherein the carriage is adapted to roll or glide on the bearing surface and to engage with the undercut. By this measure, the carriage may only move along the rail and any motion away, such as lifting of, from the rail is prevented.

The carriage may comprise a plurality of rollers, which roll on the bearing surface and on or in the undercut. This allows to provide a very low friction as well as dimensional stability in a wide temperature range.

The rear link and the carriage may both be attached to two distanced joints on an underside of the trailing edge control surface. The rear link may be coupled with a joint further to the trailing edge of the trailing edge control surface than the joint to which the carriage is attached. Depending on the shape of the track beam as well as the rail arranged on the track beam, the trailing edge control surface follows a predetermined trajectory. By integration of the second actuator into the rear link, the distance between a part of the trailing edge control surface and the track beam can actively be influenced. By coupling both the carriage and the rear link with two distanced joints on an underside of the trailing edge control surface, the incidence of the control surface changes with a change of length of the second actuator. Hence, independently of the position of the carriage on the rail, the incidence of the control surface is influenceable.

The first actuator may be coupled with e.g. a joint on the carriage and a structural part of the main wing structure. The first actuator aims at moving the carriage along the rail in order to extend or retract the control surface relatively to the main wing structure.

In a preferred embodiment, the second actuator is a fluid cylinder, such as a hydraulics cylinder, adapted for adjusting its length by the application of a certain fluid pressure. Commonly, a hydraulics cylinder comprises a piston and a piston rod extending through an end of the cylinder, wherein due to application of a fluid pressure, the piston moves inside the cylinder and pushes or pulls the piston rod. Resultantly, a distance between two ends of the second actuator changes selectively. Also, the reaction times of such a second actuator are very quick, such that by integrating a second actuator into the rear link, a quickly reacting aileron function may be realized with the trailing edge control surface.

It is to be understood that of course other actuators may be used for this purpose. Various types of actuators may provide this function. Electromechanical actuators may be used as well, as do actuators that are commonly used for high lift systems.

In a further embodiment, the rear link is arranged on a rear end of the track beam. The track beam of common flap drive kinematics usually does not extend over the trailing edge of the trailing edge flap. A rear link arranged at a rear end of the track beam may, in a neutral position of the control surface, exemplarily vertically or otherwise transverse extend to a rear end of the trailing edge control surface. By adjusting the length of the rear link through the second actuator, the incidence angle of the trailing edge control surface is adjusted. In order to allow a smooth and continuous motion of the trailing edge control surface to adjust its angle of incidence, it is advantageous to shift an outer end of the rear link opposite to the track beam slightly further downstream. This allows to avoid collisions between the rear link and the track beam when increasing the angle of incidence with the control surface being retracted through the first drive device.

Still further, the first actuator may be a rotary actuator arranged on the track beam. The rotational axis of the rotary actuator may be perpendicular to the track beam. For optimizing the aerodynamic behavior of the wing, the track beam as well as a flap track fairing surrounding the track beam are arranged substantially parallel to the longitudinal axis of the aircraft. Thus, the rotational axis may be perpendicular to the longitudinal axis of the aircraft and, consequently, substantially parallel to the lateral axis of the aircraft. The rotary actuator may comprise a lever, that is coupled with a shaft of the rotary actuator and extends to a link coupled with the control surface. This may exemplarily be coupled with a leading edge of the control surface or a joint or link in a leading edge region of the flap.

In an advantageous embodiment, the first guide device comprises a support structure, a first link arranged between a first joint on the support structure and a forward joint on the control surface, a second link arranged between a second joint and a rearward joint on the control surface, wherein the second joint is movably supported relative to the support structure and coupled with the second drive device, which is adapted to move the second joint relative to the support structure. Neglecting the movability of the second joint, the first guide device constitutes a common dropped hinge kinematics. The basic working principle of a dropped hinge kinematics lies in providing a hinge clearly under a trailing edge control surface and supporting the control surface on the hinge by means of two rigid links. By pushing or pulling one of the links into an extension direction, the control surface is moved along the substantially circular trajectory, which depends on the orientation and position of the hinge. In this embodiment, the dropped hinge kinematics is modified in that one of the two links to support the control surface is arranged on a movable second joint, which is separate from the first joint. Consequently, by moving the second joint, the associated part of the control surface is moved relative to the main wing structure as well. Since the second joint is moved through the second drive device independently from the first drive device, the angle of incidence is adjustable independently from the extension state of the control surface.

In a further advantageous embodiment, the second drive device comprises a frame element having a swiveling means and the second joint, wherein the swiveling means is rotatably supported on the support structure, wherein the second joint is arranged at a distance to the swiveling means and is connected to a first end of the second link, and wherein a second end of the second link is coupled with the control surface. The second joint is thereby realized through the asymmetrically supported frame element.

Preferably, the frame element comprises a connection means, which is connected to the second actuator. The connection means may be realized as a joint or a similar element comprising a joint or being couplable to a joint. Thereby, the frame element is directly movable through the second actuator to directly influence the incidence of the trailing edge control surface independent from the motion of the first drive device.

Further preferred, all of the swiveling means, the second joint and the connection means are arranged at a distance to each other. In a most simple case, the frame element may comprise a triangular shape, wherein each of the edges comprises a joint. Depending on the overall design of the dropped hinge kinematics, the frame element may comprise a certain orientation in a retracted position of the first drive device and in a neutral position regarding the angle of incidence of the control surface. By moving the second actuator, the frame element rotates about the swiveling means and thereby the second link carrying a rear end of the control surface is moved in accordance thereto. Consequently, the angle of incidence is changed.

In a further preferred embodiment, both the first and the second actuator are swivably mounted on the support structure. This allows to enhance the support structure in a relevant part to carry the load introduced by the actuators.

In another advantageous embodiment, a support structure is present, a first link between a first joint on the support structure and a second link between the first joint and the control surface, wherein the second actuator is integrated into the second link. Hence, by moving the second actuator, automatically the distance between a rear end of the control surface and the support structure is changed. The first actuator may be coupled with the control surface in the same way as explained above regarding the dropped hinge kinematics. In fact, the embodiment explained herewith is a modification of the above-mentioned dropped hinge kinematics. However, a movable second joint is replaced by integration of the second actuator into the second link.

The disclosure further relates to an aircraft having a wing with a wing main structure and at least one system according to the above description.

The aircraft my furthermore comprise a spoiler extending between the wing main structure and the trailing edge control surface, wherein the spoiler at least partially follows the motion of the trailing edge control surface. The function of following the motion of the trailing edge control surface may be important to allow the incidence of the control surface to be decreased, i.e. the trailing edge of the trailing edge control surface being lifted, when the control surface is in a retracted position relative to the wing main structure.

The function may be passively realized, i.e. by spring-loading the spoiler and the control surface being capable to move the spoiler out of the way.

As an alternative, the spoiler may be controlled by a control device, which is coupled with a control device controlling the trailing edge control surface, wherein the control device automatically moves the spoiler out of the way when the incidence of the trailing edge control surface is changed.

Still further, the disclosure relates to the use of a trailing edge control surface as a high lift flap and an aileron through the independent use of a first drive device and a second drive device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present disclosure result from the following description of the exemplary embodiments illustrated in the figures. In this respect, all described and/or graphically illustrated characteristics also form the object of the disclosure individually and in arbitrary combination regardless of their composition in the individual claims or their references to other claims. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1A:
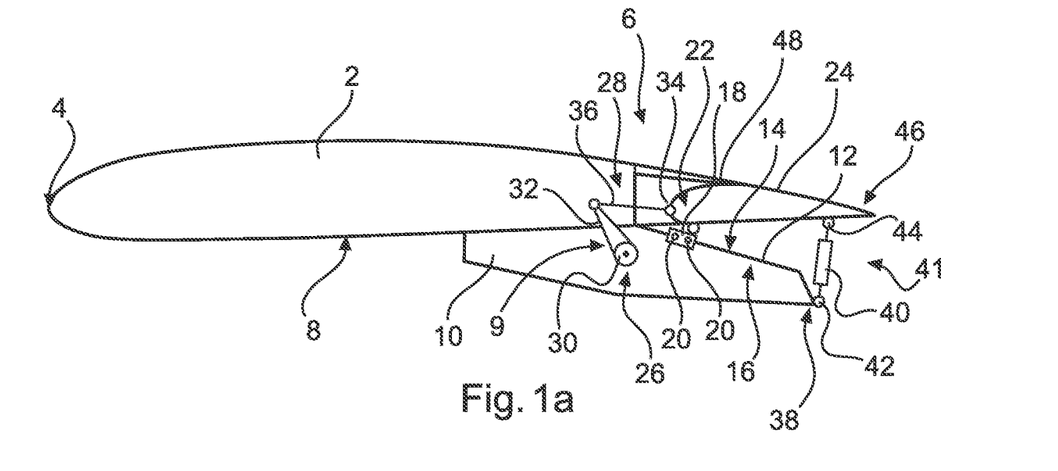
FIGS. 1a to 1f show a first exemplary embodiment of the system based on a flap track mechanics.

FIG. 1a shows a first exemplary embodiment of the system according to the invention. Here, a wing 2 is shown in a lateral cross-section with a leading edge 4 and a trailing edge region 6. At an underside 8 of wing 2 and extending into the trailing edge region 6, a track beam 10 is present. The track beam 10 carries a rail 12 facing the underside 8 of the wing 2 and providing a bearing surface 14 as well as an undercut 16.

The rail 12 supports a carriage 18, which may comprise a plurality of rollers 20 that minimize the friction and allow the carriage 18 to roll on the rail 12, particularly in a large temperature range, for withstanding high air loads and with a low maintenance need. The number of rollers 20 is only exemplarily shown. It may be beneficial to provide two pairs of rollers 20 distributed over both sides of the carriage 18 that enable to engage the rail 12 with the bearing surface 14 and the undercut 16 in order to always remain on the rail 12 and preventing a lifting off of the rail 12.

The carriage 18 in this example supports a forward end 22 of a trailing edge control surface 24 in a swivable manner. It is conceivable that the carriage 18 may also be coupled with a more central or more rearwardly placed section of the trailing edge control surface 24. In a central region of the track beam 10, a first actuator 26 of a first drive device 28 is present. The first actuator 26 is realized as a rotary actuator, which is capable to rotate around a rotational axis 30, which extends perpendicular to a main extension of the track beam 10, which in turn may be arranged parallel to a longitudinal axis of the aircraft. Attached to the first actuator 26 is a lever 32, which is coupled to a leading edge 34 of the control surface 24 through a first link 36. By rotating the first actuator 26, the first link 36 pushes or pulls the leading edge 34 of the control surface 24 back and forth on the rail 12.

At a rear end 38 of the track beam 10, a second drive device 40 in the form of a linear actuator is swivably mounted at a first end 42. An opposite second end 44 is swivably mounted to a rear end 46 of the control surface 24.

By rotating the first actuator 26, the high-lift state of the wing 2 is altered. Assuming that the second actuator 40 has a constant length, the control surface 24 increases the surface area as well as the camber of the wing 2 by rotating the first actuator 26 in a clockwise direction. Completely independent, the second actuator 40 is able to influence the position of the rear end 46 of the control surface 24, such that its angle of incidence is changing.

In other words, the control surface 24 comprises a rear link 41, into which the second drive device 40, i.e. the second actuator, is integrated.

For the sake of completeness, a spoiler 48 is shown arranged above the leading edge 34 of the control surface 24 and closing a gap between the trailing edge region 6 of the wing 2 and the control surface 24.

It is stated that the setup shown in FIG. 1a resembles a neutral state, in which the control surface 24 is completely retracted and the wing 2 has a clean configuration. By moving the second actuator 40, an aileron function is achieved, while by moving the first actuator 26, an independent high-lift condition may be assumed.

Figures 1B, 1C:
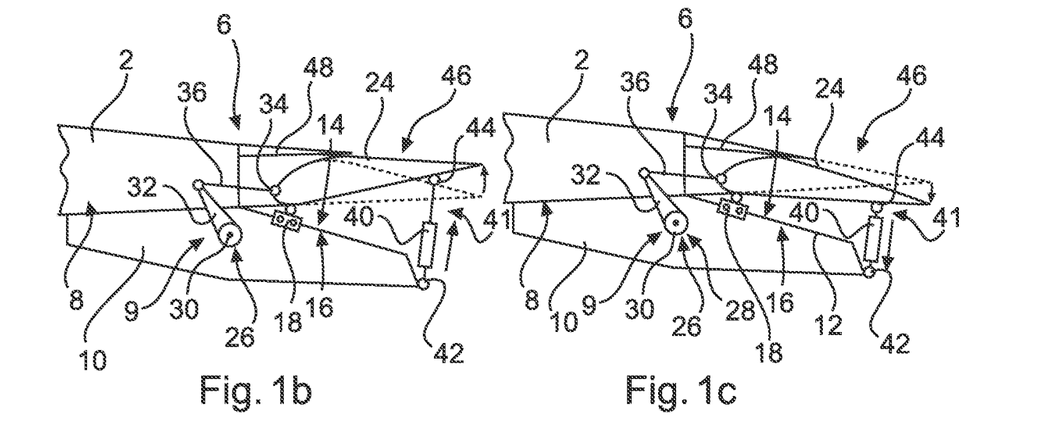

In FIG. 1b, the second actuator 40 is extended in comparison with the setup shown in FIG. 1a. Consequently, the distance between the two ends 42 and 44 of the second actuator 40 is increased, such that the rear end 46 of the control surface 24 is lifted, while the carriage 18 and the leading edge 34 of the control surface remain in place. Consequently, the angle of incidence is increased. This allows the control surface 24 to act as an aileron. In the shown setup in FIG. 1b, the control surface 24 would provide a down force.

Opposite to this, FIG. 1c shows a clearly decreased distance between the two ends 42 and 44 of the second actuator 40. Hence, the rear end 46 of the control surface 24 is lowered, which leads to an upwardly directed force.

Figure 1D:
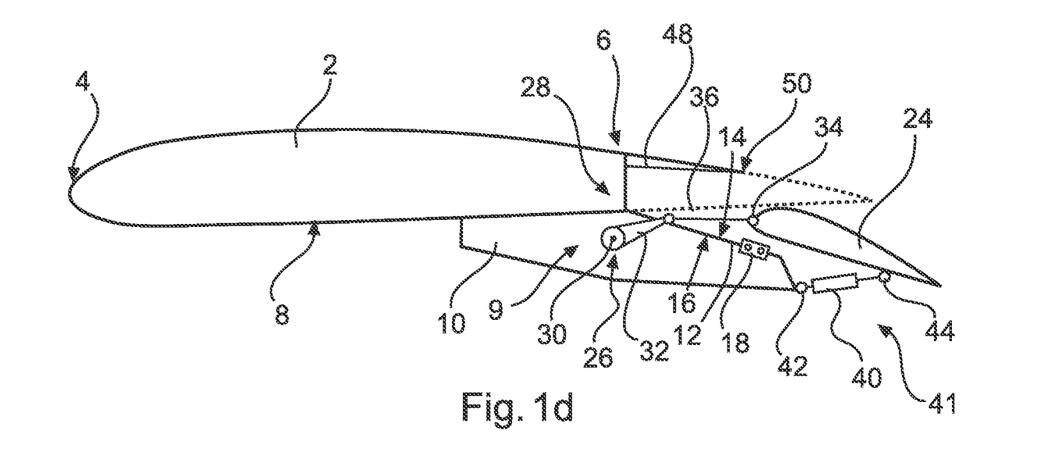

FIG. 1d shows an extension of the control surface 24 from the trailing section of wing main structure. Basically, FIG. 1d shows a high-lift state, in which a clear gap 50 is created to the wing main structure. The first actuator 26 is in a rearmost position, such that the link 36 has pushed the leading edge 34 and the carriage 18 to a rearmost position. If the second actuator 40 comprises a constant length, i.e. distance between the two ends 42 and 44, only a high-lift motion is conducted.

Figure 1E:
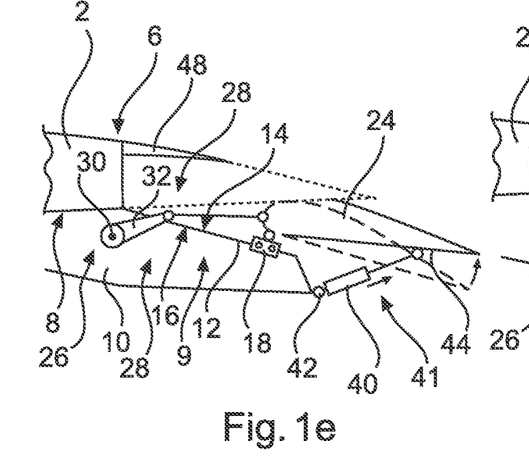
Figure 1F:
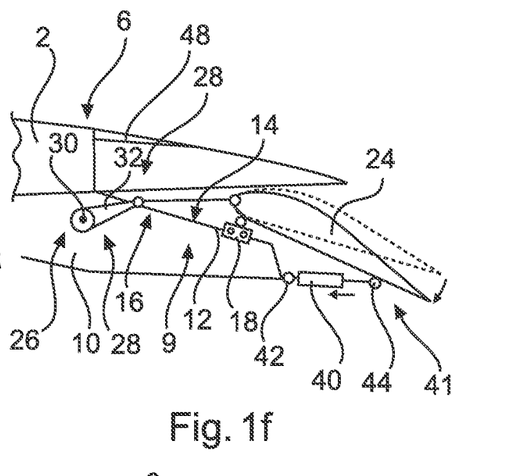

Even in this position of the control surface 24, the angle of incidence of the control surface 24 may be influenced as shown in FIGS. 1e and 1f. In FIG. 1e, the second actuator 40 provides a larger distance between the two ends 42 and 44 in comparison to FIG. 1f. Consequently, completely independent from a high-lift motion, the control surface 24 may act as an aileron for providing an attitude control, e.g. during landing or take-off.

Figure 2A:
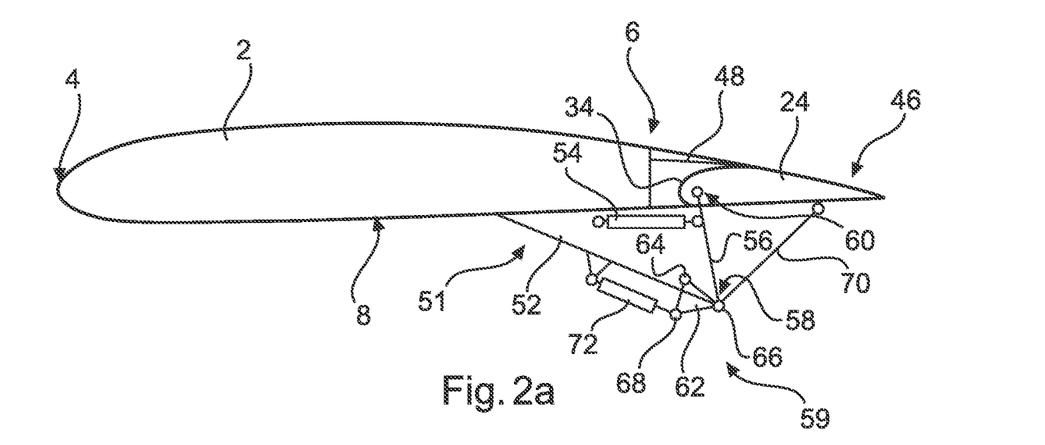
FIGS. 2a to 2f show a second exemplary embodiment of the system based on a dropped hinge mechanics with a movable joint for a rear link.

In FIG. 2a, a different approach with a first guide device 51 is shown. Here, a support structure 52 is arranged at the underside 8 of the wing 2, which holds a first drive device 54, which is realized in form of a linear first actuator 54, and a first link 56, which is swivably mounted on a first joint 58 on the support structure 52 and with a second end 60 on a leading edge 34 of the control surface 24. It is denoted that in FIG. 2a, the first joint 58 of the first link 56 is hidden behind a frame element 60.

As a part of a second drive device 59, the frame element 60 comprises a swiveling means 64, a second joint 66 and a connection means 68. The swiveling means 64 is swivably mounted on the support structure 52, while the second joint 66 is connected to a second link 70, which extends to a rear end 46 of the control surface 24. The connection means 68 in turn is coupled with a second actuator 72, which is swivably mounted on the support structure 52. When the second actuator 72 is moved, the frame element 62 rotates around the swiveling means 64 on the support structure 52. Consequently, the second joint 66 and thus the second link 70 is pushed or pulled back and forth to lift or lower the rear end 46 of the control surface 24.

If the first actuator 54 is moved, the first link 56 pushes the leading edge 34 of the control surface 24 rearwards or pulls it in a forward direction. Due to the connection to the second link 70, certain motion constraints occur. By the position of the first link 56 as well as of the frame element 62, the position and orientation of the control surface 24 depends on the motion of the first actuator 54. The angle of incidence of the control surface 24 can be adjusted by moving the second actuator 72. Both actuators can be moved independently from each other, such that even more complex trajectories may be accomplished. For example, the camber and the surface area can be influenced with different ratios.

Figure 2B:
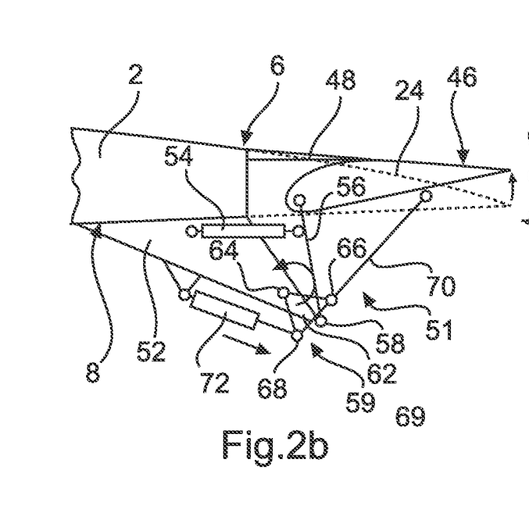

Some examples of possible motions are shown in FIGS. 2b to 2f. In FIG. 2b, the second actuator 72 is extended, such that the frame element 62 is rotated in a counter-clockwise direction. Resultantly, the second link 70 lifts the rear end 46 of the control surface 24, such that its angle of incidence changes. Due to this change in incidence, the control surface 24 would provide a down force. As the first actuator 54 is still completely retracted, the control surface 24 exclusively acts as an aileron.

Figure 2C:
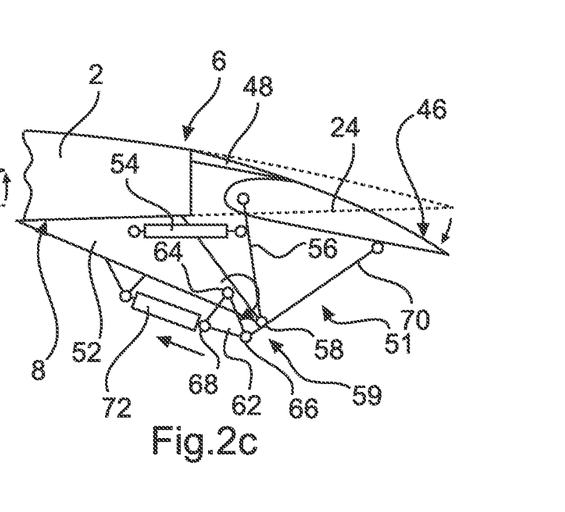

In FIG. 2c, the first actuator 54 is also in a fully retracted position, while the second actuator 72 is also fully retracted. Compared to FIG. 2b, the frame element 62 is rotated in a clockwise direction, such that the second link 70 lowers the rear end 46 of the control surface 24. This increases the camber of the wing without increasing its surface area. Resultantly, the control surface 24 provides an upwardly directed force.

Figure 2D:
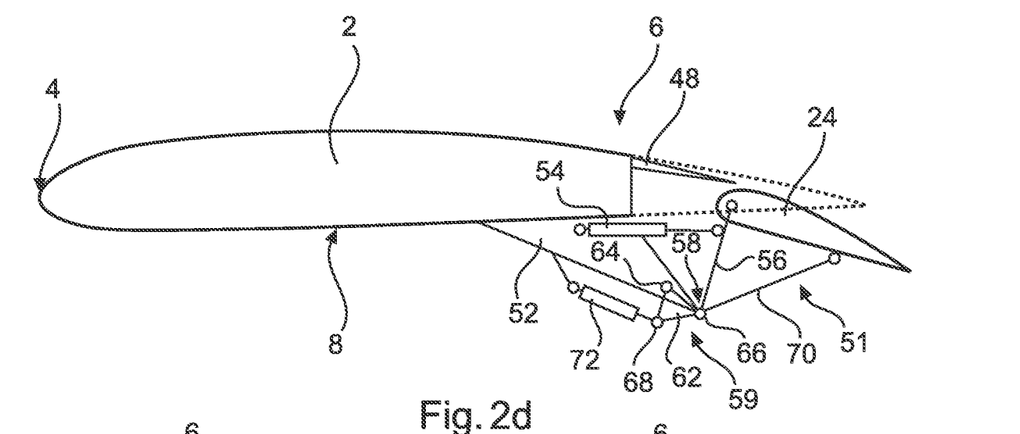

FIG. 2d shows an extended control surface 24 with the second actuator 72 being in a center position. Hence, the control surface 24 merely acts as a high-lift surface to increase the surface area of the wing 2 as well as the camber.

Figure 2E:
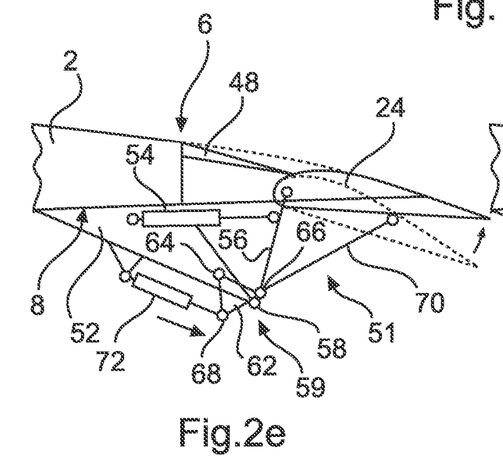
Figure 2F:
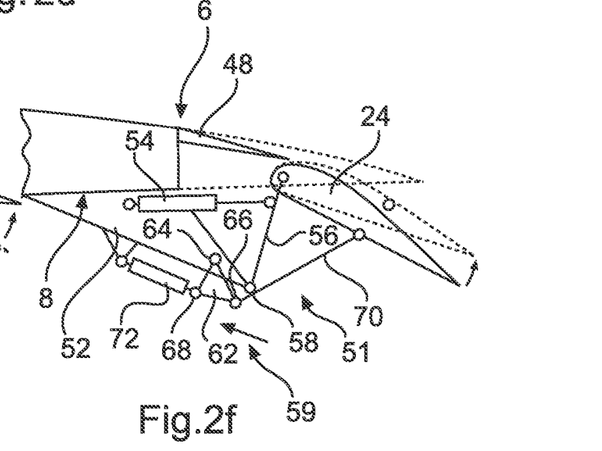

By additionally moving the second actuator 72, e.g. by extending or retracting it, the incidence angle of the control surface 24 may additionally be adjusted. In FIG. 2e, control surface 24 is almost parallelly shifted compared to a completely retracted position, i.e. a clean wing. Here, the second actuator 72 is fully extended, while in FIG. 2*f*, the second actuator 72 is fully retracted.

Figure 3A:
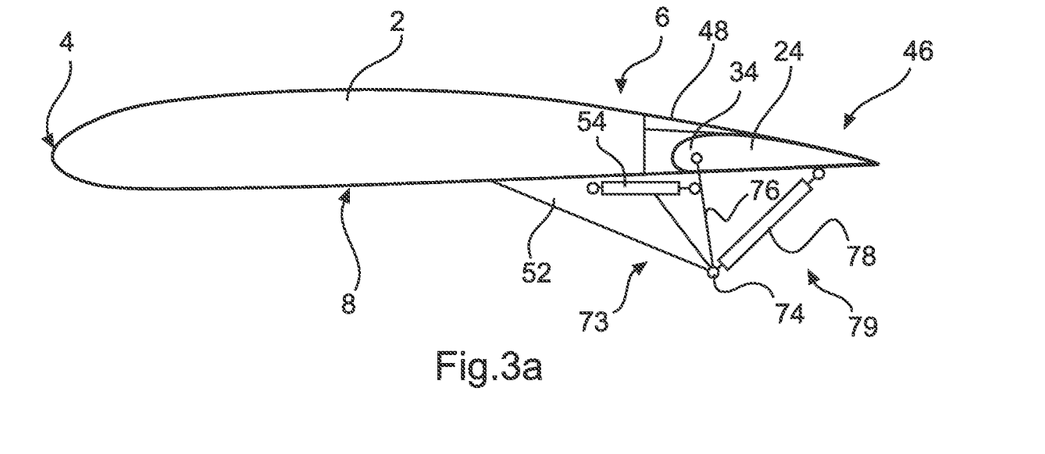
FIGS. 3a to 3f show a third exemplary embodiment of the system based on a dropped hinge mechanics with a rear link having an adjustable length.

FIG. 3*a* shows a still further working principle, which is also based on a dropped hinge kinematics with a first guide device 73. Here, the same support structure 52 is used, to which again the first drive device 54 in the form of a linear actuator (see FIGS. 2*a* to 2*f*) is attached. The control surface 24 is coupled with a hinge 74 through a first link 76 and a second link 79. A second drive device 78, which is realized in the form of a linear second actuator 78, is integrated into the second link 79. The first link 76 extends from the hinge 74 to the leading edge 34 of the control surface 24, while the second actuator 78 extends from the hinge 74 to the rear end 46 of the control surface 24. Consequently, by moving the first actuator 54, the control surface 24 is extended from the wing 2.

If the second actuator 78 remains at a constant extension, the control surface 24 simply follows a high-lift motion trajectory. By moving the second actuator 78, additionally the rear end 46 the control surface 24 is lifted or lowered, such that its incidence angle is adjusted independently from the motion of the first actuator 54.

Figure 3B:
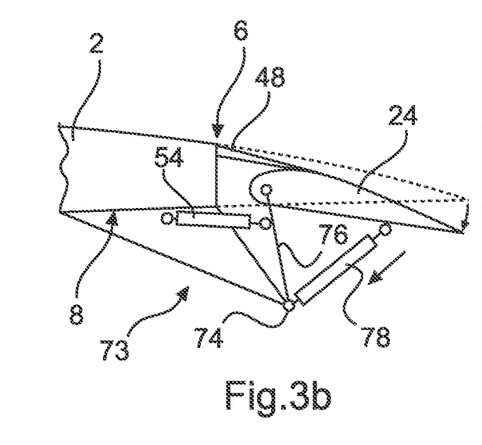

In FIG. 3*b*, the incidence angle of control surface 24 is increased by retracting the second actuator 78, while the first actuator 54 remains at a retracted position. Consequently, an upwardly directed force is created by the control surface 24.

Figure 3C:
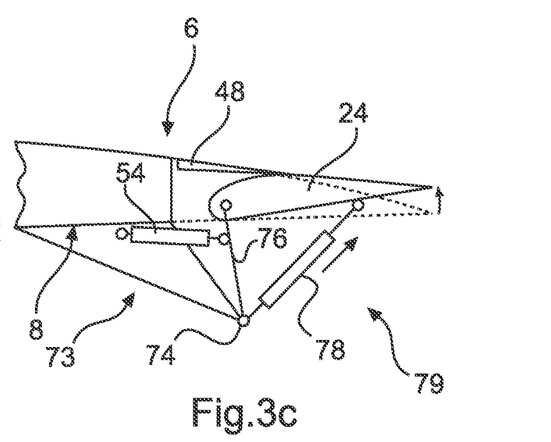

In FIG. 3*c*, the second actuator 78 is completely extended, such that the incidence angle is clearly changed. Again, the first actuator 54 remains completely retracted. Resultantly, the control surface 24 simply acts as an aileron and in FIG. 3C provides a downward directed force.

Figure 3D:
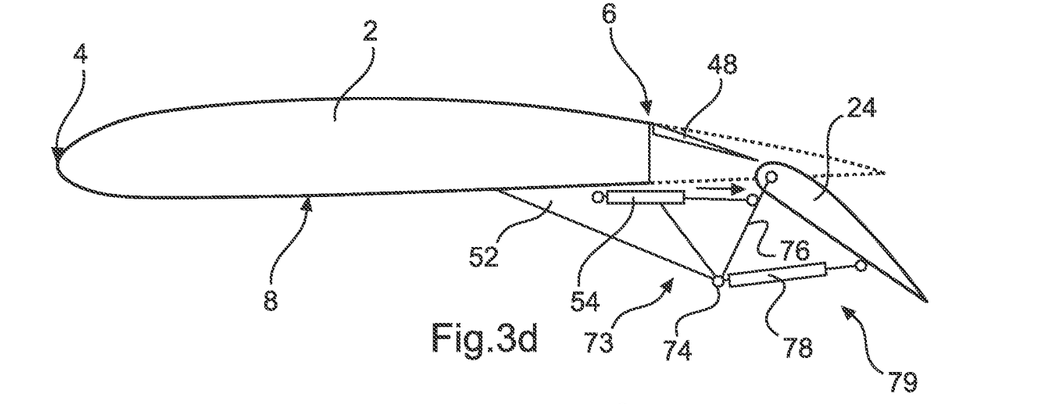

In FIG. 3*d*, the second actuator 78 remains in a center position, while the first actuator 54 is completely extended. The control surface 24 resultantly is moved into an extended high-lift position.

Figure 3E:
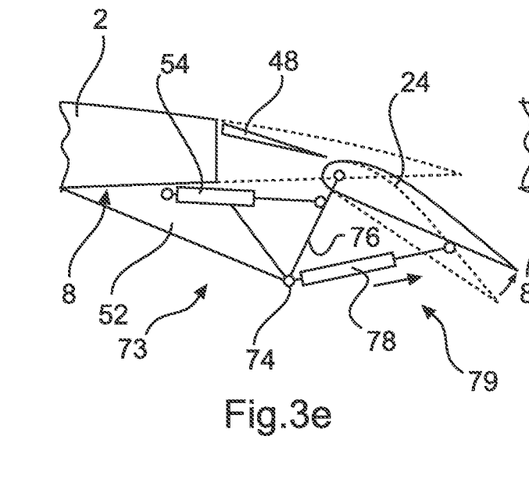
Figure 3F:
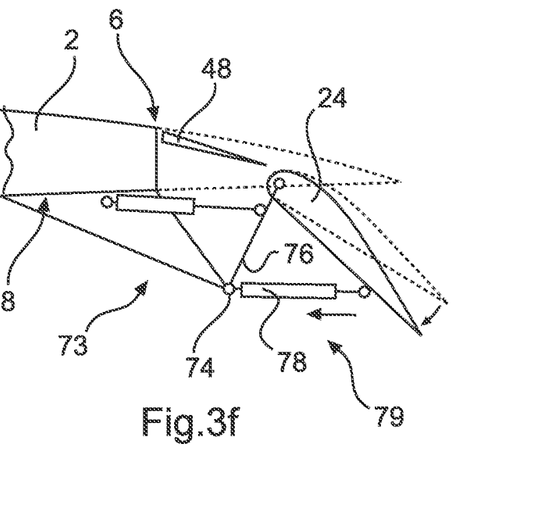

Still further, in this position of the first actuator 54, the second actuator 78 may be completely extended (FIG. 3*e*) or retracted (FIG. 3*f*). Hence, also in a high-lift state, the control surface 24 may act as an aileron to provide an additional positive or negative vertical force for influencing the attitude control of the aircraft.

Figure 4:
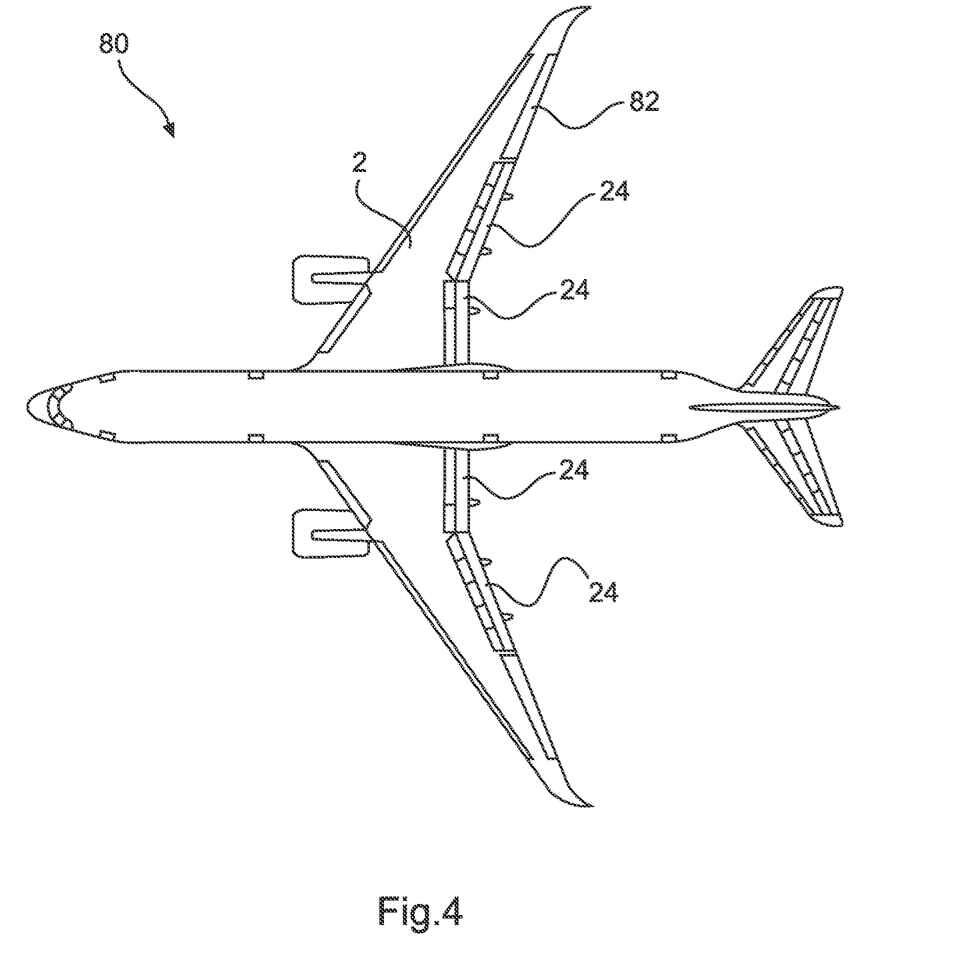
FIG. 4 shows an aircraft having a system according to an embodiment of the invention.

Exemplarily, FIG. 4 shows an aircraft 80 having a wing 2, to which a plurality of control surfaces 24 may be attached. Instead of relying on outboard positioned ailerons 82, also further inboard directed control surfaces 24 may act as ailerons.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for driving and guiding of a trailing edge control surface arranged on a trailing edge region of a wing of an aircraft, the system comprising:
    a first guide device attachable to the wing and coupled with the control surface to guide the control surface along a predetermined trajectory relative to the trailing edge region of the wing between a retracted position and at least one extended position;
    a first drive device couplable with the wing and the control surface to move the control surface along the trajectory;
    a second drive device coupled with the control surface and couplable with one of the wing and the first guide device to influence the incidence angle of the control surface;
    wherein the first drive device and the second drive device are separate from each other and are operable independently, such that the incidence angle of the control surface is influencable at least in the retracted position of the control surface;
    wherein the first guide device comprises a rail on a track beam, a carriage movably engaging the rail and a rear link swivably mounted to the track beam;
    wherein the control surface is coupled with the carriage and the rear link; and,
    wherein the second drive device is integrated into the rear link.

2. The system of claim 1, wherein:
    the first drive device comprises a first actuator;
    the second drive device comprises a second actuator; and
    the first actuator and the second actuator have a different type of functional principle.

3. The system of claim 2, wherein the first actuator and the second actuator comprise different mechanical time constants.

4. The system of claim 2, wherein the first actuator is self-locking.

5. The system of claim 1, wherein the rear link is arranged on a rear end of the track beam.

6. The system of claim 1, wherein the first drive device comprises a rotary actuator, which is arranged on the track beam.

7. The system of claim 2, wherein:
    the first guide device comprises a support structure, a first link to a first joint arranged on the support structure and a second link to a second joint;
    the second joint is movably supported relative to the support structure and is coupled with the second drive device; and
    the second drive device is adapted to move the second joint relative to the support structure.

8. The system of claim 7, wherein:
    the second drive device comprises a frame element having a swiveling means and the second link;
    the swiveling means is rotatably supported on the support structure;
    the second joint is arranged at a distance to the swiveling means and is connected to a first end of the second link; and
    a second end of the second link is coupled with the control surface.

9. The system of claim 8, wherein the frame element comprises a connection means connected to the second actuator.

10. The system of claim 1, further comprising:
a support structure;
a first link between a first joint on the support structure; and
a second link between the first joint and the control surface, wherein the second drive device is integrated into the second link.

11. An aircraft comprising:
a wing with a wing main structure; and
at least one system according to claim 1.

12. The aircraft of claim 11, further comprising a spoiler extending between the wing main structure and the trailing edge control surface, wherein the spoiler at least partially follows the motion of the trailing edge control surface.

13. A method of use of a trailing edge control surface as a high lift flap and an aileron comprising the steps of independently using the first drive device and the second drive device according to claim 1.

* * * * *